June 11, 1957 J. HANSEN 2,795,255
BREAD-SLICING BLADE OF ENDLESS BAND TYPE
Filed May 3, 1954
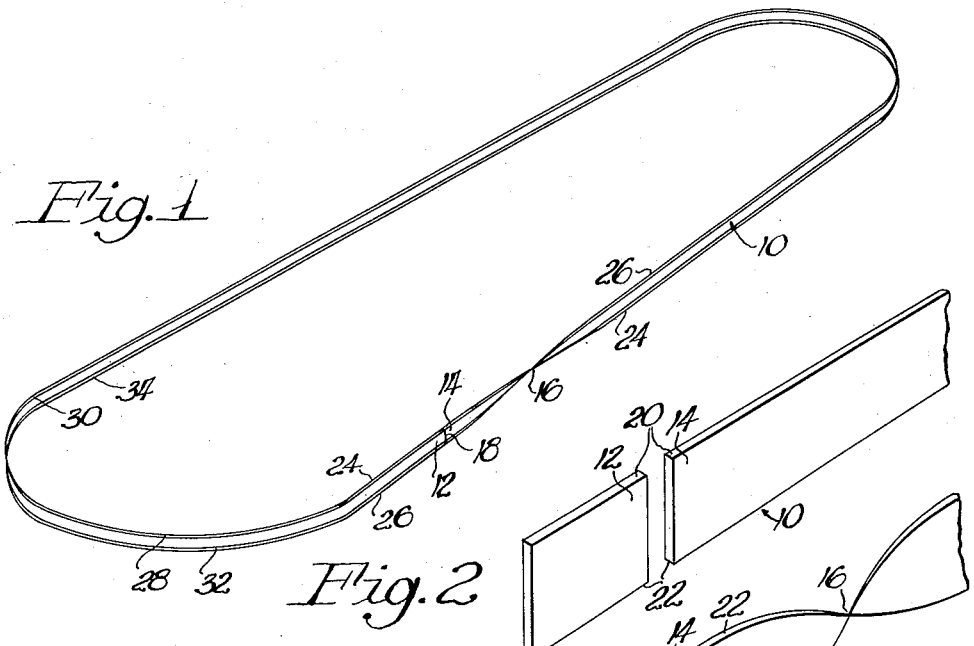
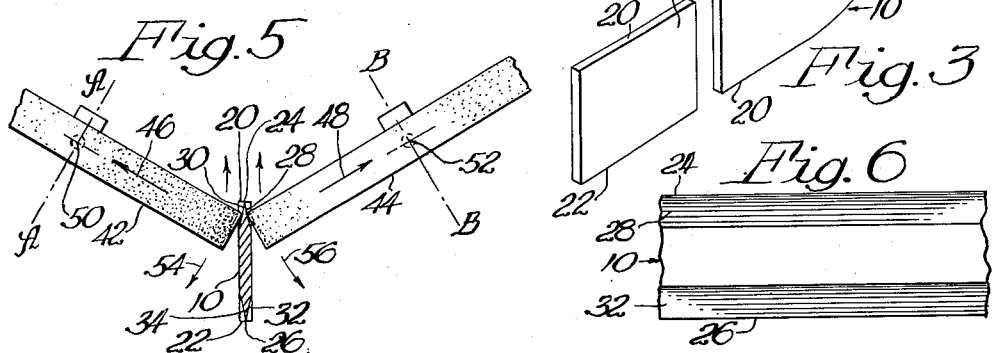
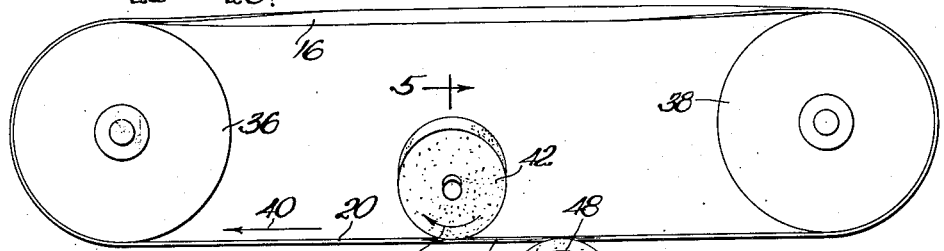
INVENTOR.
John Hansen
BY

United States Patent Office 2,795,255
Patented June 11, 1957

2,795,255

BREAD-SLICING BLADE OF ENDLESS BAND TYPE

John Hansen, Bettendorf, Iowa

Application May 3, 1954, Serial No. 427,031

4 Claims. (Cl. 146—88)

This invention relates to a bread-slicing blade of the endless or band type such as is used in sets in bread-slicing machines in the larger bakeries. More particularly, the invention relates to an improved hollow ground blade in which the grinding marks are parallel to the length of the blade. Still more particularly, the invention contemplates a double-edged blade having a 180° twist therein so that each cutting edge crosses over to the other at the twist to produce in effect an endless cutting edge having twice the length or travel of prior art bands before repeating itself.

For many years, the bread baking and slicing industry has used scalloped or toothed blades of the character shown in the U. S. Patent to Hansen 2,002,812, first in the reciprocating form and later in the band or endless form, the principal difference between the two being that the reciprocating blade, as the name suggests, is bi-directional and the band blade is uni-directional. During the development and refinement periods of these blades, it was accepted that scallops or teeth of some kind had to be formed on the blade to obtain penetration. For a long period, the nature of the bread determined the apparent need for teeth or scallops, because bread in the past was relatively firm and tough, both as to interior or crust. More recently, however, bakers are slicing bread substantially immediately after its removal from the oven and this factor, plus the use of newer types of shortening and other baking innovations, presents to the slicer a loaf that is quite soft and somewhat easier, in some respects to slice. However, slicing ease does not mean that the toothed or scalloped blades of the type mentioned above or even that in the U. S. Patent to Hansen 2,596,851 will perform efficiently, because the softer loaf has brought new problems, among which is the lack of outstanding performance, at least in some cases, of the known types of blades.

According to the present invention a novel and materially less expensive band blade is provided, needing only a relatively thin cutting edge, preferably hollow-ground, and having no teeth or scallops. The novel characteristic of the new blade is, in one aspect, the grinding of the cutting edge in such manner that the grinding marks are parallel to the length of the band, thus eliminating megascopic ridges transverse to the cutting edge and thereby enabling the blade to travel at conventional high speeds (1400–1800 feet per minute) without tearing and bringing interior portions of the bread to the surface (sometimes called "snow," "sawdust," "doughballs," etc.). This characteristic of the blade—grinding parallel to the cutting edge—is accomplished by passing a strip or band of blade material in a straight-line path adjacent to a rotating grinding wheel and oscillating the wheel about an axis parallel to the blade path (or normal to the rotating axis) so that the periphery of the wheel not only travels in its circular path of rotation but moves also in an arcuate path transverse to the blade path.

Another feature of the invention is the "doubling of the length" of the band by putting a 180° twist in the band material before the ends of the band strip are joined together. This means that the cutting edges must be on both edges of the band and that these edges will cross over at the twist, doubling the length of each edge before it repeats itself. Of material importance as a feature of the hollow-ground or beveled edge is the ease with which it may be honed without requiring its removal from the slicing machine. Since the blade has no teeth or scallops, there is nothing critical to change shape as a result of honing.

The foregoing and other important objects and significant features, inherent in and encompassed by the invention, will become apparent as the disclosure of a preferred embodiment thereof progresses in the following description and accompanying sheet of drawings, the several figures of which are described immediately below.

Figure 1 is a perspective view of a complete band blade embodying both the hollow-ground edges and the 180° twist.

Figure 2 is a fragmentary view, on an enlarged scale, showing a step preliminary to joining the ends of a blade strip to form the band.

Figure 3 shows a second step: that of placing a 180° twist in one end portion of the strip just before joining.

Figure 4 illustrates somewhat schematically a method of hollow grinding the band so as to leave the grinding marks parallel to the cutting edge.

Figure 5 is a transverse sectional view, enlarged, as seen substantially on 5—5 of Figure 4.

Figure 6 is a fragmentary elevational view of the blade shown in section in Figure 5.

The complete blade, shown in Figure 1 and designated generally by the numeral 10, embodies all the specific features of the present invention. As shown in Figure 2 this blade may be formed from a strip of blade material having opposite ends 12 and 14, and as a preliminary step to joining these ends to form the endless band, the ends are brought into proximity as shown in Figure 2 and then one of the end portions (here 14) is given a 180° twist as at 16 and the ends are then butted together and welded or brazed at a junction 18 (Figure 1). This joint is subsequently polished so that its presence does not effect the operation of the blade, and the line shown at 18 in Figure 1 is for purposes of illustration only.

As shown in Figures 2 and 3 and in part in Figure 5 the blade stock is originally rectangular in section and has opposite edges 20 and 22, each of which is hollow ground at opposite sides to provide a sharpened cutting edge, such cutting edge being formed at 24 along the edge 20 and a similar cutting edge 26 being formed along the edge 22. The ultimate cross section of the blade appears in Figure 5, the cutting edge 24 being accomplished by hollow grinding at opposite sides as at 28 and 30 and the cutting edge 26 being hollow at opposite sides as at 32 and 34.

Because of the twist or cross-over at 16, the cutting edge 24, appearing as a top edge in a major portion of Figure 1, crosses over at 16 and becomes the bottom cutting edge, which then extends as a bottom cutting edge for a major portion of the length of the band and then crosses over to become a top edge 26. Thus, each edge is twice the "length" that it would be were it not for the twist at 16. This means that each edge is of double length as respects the intervals at which it will repeat itself.

Figures 4 and 5 illustrate a preferred method of hollow grinding the band. As shown in this figure the band has been formed to that step of completion in which it is endless and the grinding is done thereafter; although, it will be apparent that the edges could be put on before forming the junction at 18. As shown in Figure 4 the endless band 10 is trained about a pair of drums 36 and 38, one of which may be rotated by any suitable means (not shown) to cause one run of the band to move along a straight-line path in the direction of the arrow 40. Grinding wheels 42 and 44 are positioned respectively at opposite sides of the band for rotation respectively on axes AA and BB. The wheels may rotate in the directions of the arrows 46 and 48 respectively.

As shown in Figure 5 the axis AA of the wheel 42 is inclined to the plane of the blade 10, but the angle of inclination is changeable because the wheel is mounted also on an oscillation axis 50. The same is true of the wheel 44, an oscillation axis being shown at 52. As the blade moves along its straight line path 40 between the wheels 42 and 44, the wheels are rotated about their axes AA and BB and at the same time are oscillated about their axes 50 and 52, as suggested by the arrows 54 and 56. This means that the periphery of each wheel travels not only in a circular path about its axis of rotation but also in an arcuate path about its axis of oscillation, thus hollow grinding the blade at opposite sides adjacent to one of its proximate edges. After this operation has been performed to grind the sharp cutting edge 24, the band may be removed from the drums 36 and 38 and reversed so that the sharp cutting edge 26 may be ground. Without the twist 16 the cutting edge need be formed on only one side, which is within the scope of the present invention with respect to the novel feature of grinding so that the grinding marks are parallel to the cutting edge, which is emphasized in Figure 6.

The grinding wheels 42 and 44 are offset along the path of the blade so that there is no conflict between them. Of course, as already stated, the illustration is somewhat schematic and additional mechanism would be necessarily provided in a commercial machine, which details are deemed to be unnecessary to the present disclosure.

The various features of the invention have been pointed out at length in the introduction to this description. Other features not specifically enumerated herein will undoubtedly occur to those versed in the art, as will variations and modifications in the preferred embodiment of the invention disclosed, all of which may be achieved without departing from the spirit and scope of the invention.

What is claimed is:

1. A bread-slicing blade of the character described, comprising: an endless band having opposite endless edges, at least one of said edges constituting a ground cutting edge on which the grinding marks are parallel to the length of the band.

2. A bread-slicing blade of the character described, comprising: an endless band having opposite endless cutting edges sharpened by grinding, and each cutting edge having the grinding marks parallel to the length of the band.

3. A bread-slicing blade of the character described, comprising: an endless band having opposite endless edges, at least one of said edges constituting a hollow ground cutting edge on which the grinding marks are parallel to the length of the band.

4. A bread-slicing blade of the character described, comprising: an endless band having opposite endless hollow ground cutting edges, and each cutting edge having the grinding marks parallel to the length of the band.

References Cited in the file of this patent

UNITED STATES PATENTS

| | | |
|---|---|---|
| 121,963 | Radford | Dec. 19, 1871 |
| 1,916,596 | Winfree | July 4, 1933 |
| 1,963,449 | Rubin | June 19, 1934 |
| 2,269,556 | St. Clair | Jan. 13, 1942 |

FOREIGN PATENTS

| | | |
|---|---|---|
| 12,233 | Great Britain | 1911 |